United States Patent [19]
Sherman et al.

[11] Patent Number: 5,985,416
[45] Date of Patent: *Nov. 16, 1999

[54] COATING AND TRANSFER PRINTING METAL SUBSTRATES

[75] Inventors: Louis R. Sherman; Thomas R. Dunnavant, both of Sidney, Ohio

[73] Assignee: American Trim, LLC, Sydney, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/451,700

[22] Filed: May 26, 1995

[51] Int. Cl.$^6$ ............................. B32B 3/00; B31F 1/07; D06P 1/02
[52] U.S. Cl. ..................... 428/195; 428/206; 428/207; 428/209; 428/480; 428/482; 428/913; 428/914; 8/471; 503/227; 101/9; 101/33; 101/34; 101/35; 101/38.1; 101/39; 101/40; 101/488
[58] Field of Search ............................ 8/471; 428/195, 428/913, 914, 206, 207, 209, 480, 482; 503/227; 101/9, 33–35, 38.1, 39, 40, 488

[56] References Cited

U.S. PATENT DOCUMENTS

| | | | |
|---|---|---|---|
| 4,587,155 | 5/1986 | Durand | 428/195 |
| 4,668,239 | 5/1987 | Durand | 8/471 |
| 4,670,084 | 6/1987 | Durand | 156/540 |
| 5,290,424 | 3/1994 | Mozelewski et al. | 205/116 |
| 5,318,942 | 6/1994 | Laudy | 503/227 |

FOREIGN PATENT DOCUMENTS

| | | |
|---|---|---|
| 1108929 | 9/1981 | Canada . |
| 9221514 | 12/1992 | WIPO . |

OTHER PUBLICATIONS

Newman, Robert B., "Sublimation Printing on Unsealed Aluminum Metal" Light Metal Finishing, Session K pp. 1–6, 1979 (May).

Stahls' 1993–94 Buyer's Guide, "Personalization Pays!," pp. 1–3, 38 and back cover.

Untitled Paper, Sublimation System, Inc., (Apr., 1979).

*Primary Examiner*—Leszek Kiliman
*Attorney, Agent, or Firm*—Rankin, Hill, Porter & Clark LLP

[57] ABSTRACT

A process for coating and transfer printing sheet metal which is especially suited for manufacture into three-dimensional articles such as appliance panels and one-piece pictures and frames. The coatings may include a thin pigmented base coat and a clear, thin top coat. A decorative image is transfer printed in the clear top coat.

27 Claims, 1 Drawing Sheet

COATING AND TRANSFER PRINTING METAL SUBSTRATES

BACKGROUND OF THE INVENTION

1. Field of the Invention

This invention relates to transfer printing of sheet metal and in particular to a method of applying a pigmented base coat and a clear top coat to metal strip and transfer printing an image on the coated sheet metal. Transfer printing such as sublimation printing transfers dyes or inks into the clear coating on the metal by pressing transfer paper against the clear coated surface under heat and pressure.

2. Background Art

Transfer printing of inks or dyes into a variety of articles such as shirts, mugs, plastic articles and plastic coated substrates is well known in the art. Dispersible dye crystals or inks are printed in reverse images in transfer paper which is to be used to transfer print the article to be decorated. The article to be decorated is usually made of plastic or has a plastic or polymer coating on it into which the dyes are transferred. However, some transfer printing can be effective with most synthetic materials including the fibers in shirts.

Most transfer printing is referred to as sublimation printing in which the dyes are said to sublimate under heat and pressure to be driven into any receptive substrate that is put in contact with the transfer paper. Such sublimation printing was developed circa 1969 and has been used extensively to print many articles including plastic coated metal substrates.

Transfer printing also includes a melt printing process which is as described in several patents and patent applications including U.S. Pat. Nos. 4,587,155; 4,670,084; 4,668,239 and Published Application WO 92/21514. According to U.S. Pat. No. 4,587,155, the desired dye image is transferred from the paper to the substrate by heating the dye to a temperature above its melting point but below its vaporization temperature so the dye will disfuse into the softened plastic substrate. Published Application WO 92/21514 describes melt printing of planar metal base members such as aluminum, steel or the like which have been coated on at least one planar surface with a melt printable layer of softenable, dye-permeable, thermoplastic or thermoset material such as polyethylene terephthalate, polybutylene terephthalate or other thermoplastic polyesters, polycarbonates, nylons and the like. Application WO 92/21514 further describes bilayer coatings of thermoplastic or thermoset materials including a base coat optimally provided with a pigment and a second layer that can comprise a clear resin. The application states that neither the composition nor the thickness of either the substrate or the printable plastic layers is critical.

Canadian Patent 1,108,929 describes a process for applying designs to unsealed, anodized aluminum which is continuously heated to a temperature at which colored components of ink will sublime. The heated strip is fed into contact with an ink carrying web so the ink is heated and transferred into the anodized aluminum surface. The decorated aluminum strip is then cooled with water and passed through a sealing bath filled with a sealing solution such as buffered aqueous nickel.

An improved process is needed for coating metal substrates for transfer printing to produce decorated sheets having consistent bright coloring with little or no texturing of the surface of the sheet. The process should produce decorated sheet metal that can be subsequently formed into shaped articles such as appliance panels or three dimensional pictures and signs without cracking or crazing of the coatings on the sheet metal. Coatings which have typically been used on transfer printed metal substrates cannot withstand the stringent forming requirements which include required bends with radii equal to approximately twice the metal thickness or more. Prior art coatings have also had poor resistance to ultraviolet light (UV) exposure and have frequently stained when exposed to washing aids such as bleach and solvent-based spot removers or to food products and alkalis. A process is needed for producing a thin, clear coating which has a uniform thickness with virtually no pin holes or other defects which might interfere with transfer printing including sublimation printing and melt printing. Improved transfer printed metal sheets are needed which are suitable for manufacture into a variety of products such as appliance panels, one-piece three-dimensional pictures and frames, and signs.

SUMMARY OF THE INVENTION

This invention provides a process for coating metal sheets which are especially well suited to be transfer printed with decorative or informative images. The invention further provides a process for manufacturing transfer printed metal sheets and provides decorated sheets produced by such process. In accordance with this method, cleaned strip metal or metal sheets are coated with a pigmented base coat, followed by coating with a clear top coat, cut into individual sheets and then transfer printed as by sublimation printing or alternatively by melt printing. The preferred method for applying the base coat and the top coat is by roll coating or reverse roll coating. Both the base coat and the top coat are preferably thermoset resins which are heat cured on the sheet. The base coat includes a pigment such as titanium oxide and the top coat is clear so the inks or dyes which are transferred into the top coat will produce a bright precise image on the sheet. Both the base coat and the top coat are thin such as approximately 0.0004 to 0.001 inch thick. The top coat should be uniform in thickness and have virtually no pin holes or other defects which would interfere with producing a clear and consistent image in the coating.

Accordingly, an object of this invention is to provide an improved process for coating sheet metal which is adapted to be decorated by transfer printing.

A further object is to provide an improved process for producing transfer printed metal sheets.

Another object is to provide transfer printed metal sheets having improved clarity, uniformity of print quality, resistance to UV light and resistance to staining, and which are adapted to be formed into three-dimensional shapes by bending the decorated metal on radii as small as two metal thicknesses.

The above and other objects and advantages of this invention will be more fully understood and appreciated with reference to the following description and the claims appended hereto.

DESCRIPTION OF THE PREFERRED EMBODIMENTS

Figure 1:
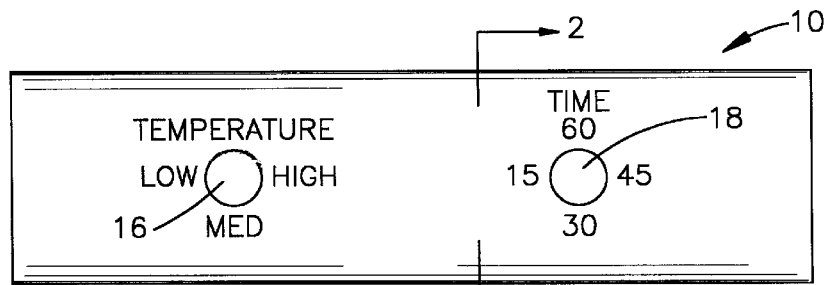
FIG. 1 is a plan view of an appliance panel which has been produced in accordance with this invention.
Figure 2:
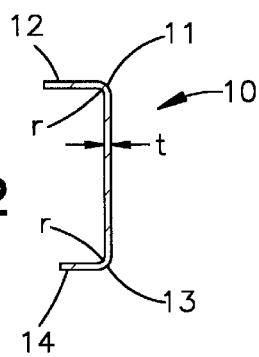
FIG. 2 is a cross-sectional view through the panel of FIG. 1 taken along line 2—2 in FIG. 1.

Referring to the drawings, FIGS. 1 and 2 show an appliance panel 10 which is suitable to be produced in accordance with this invention. The panel is made from sheet metal and preferably sheet aluminum which is about 0.010 to 0.040 inch thick and preferably about 0.019 inch thick. In a preferred embodiment, the aluminum can be a 3000 or 5000 series alloy such as 3004 or 5052, as designated by the Aluminum Association, in an intermediate to hard temper. As best seen in FIG. 2, the panel 10 has been formed to provide flanges on it for attachment to an appliance such as a washing machine or clothes dryer. The radii "r" at corners 11, 13 may be as small as two times metal thickness "t" which puts considerable stress and strain in any coatings on the panel. Holes 16,18 have also been punched or cut in the panel 10 for receiving pins, not shown, for dials or knobs to be attached for operating machine controls. The panel has also been coated and printed with instructions and settings for operation of the appliance.

Figure 3:
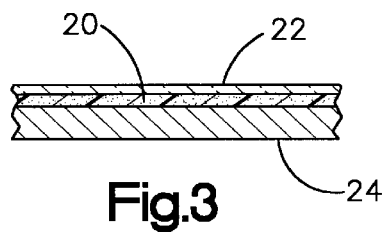
FIG. 3 is an enlarged fragmentarily cross-sectional view of the panel of FIG. 1.

FIG. 3 is an enlarged cross section through the panel 10 of FIGS. 1 and 2 showing a base coat 20 and a top coat 22 on the metal substrate 24. The base coat 20 may be a variety of thermosetting polymers such as polyesters, epoxies or the like, and has a pigment such as titanium oxide in it to provide a solid color background for printing. In a preferred embodiment, the base coat 20 is a thermosetting polyester enamel such as white appliance enamel sold by Lilly Industries, Inc. of Indianapolis, Ind. under Code 95101-7299. Such enamel has a viscosity of 22±2 seconds on a #4 Zahn scale at 80° F., a flash point of about 90–100° F., a weight of about 12 pounds per gallon and contains approximately 66% solids.

The top coat 22 may also be a variety of thermosetting polymers such as polyesters and epoxies. A preferred top coat 22 is a thermosetting polyester sold by Lilly Industries, Inc. under code 95110-7300. This resin has a viscosity of about 20±2 seconds on a #4 Zahn scale, weighs about 8.5 pounds per gallon and contains about 53% solids. The top coat must be substantially clear so it will not screen or interfere with visibility of the transfer inks or dyes which are diffused into the coating.

It is important to this invention that the coatings 20 and 22 be thermoset resins which will not soften when the coated metal is heated as when the panel 10 is transfer printed or later heated during use of the panel on an appliance or the like. Thermoset polymers are also not soluble in solvents or the like that can cause discoloration or degradation of the coatings.

Figure 4:
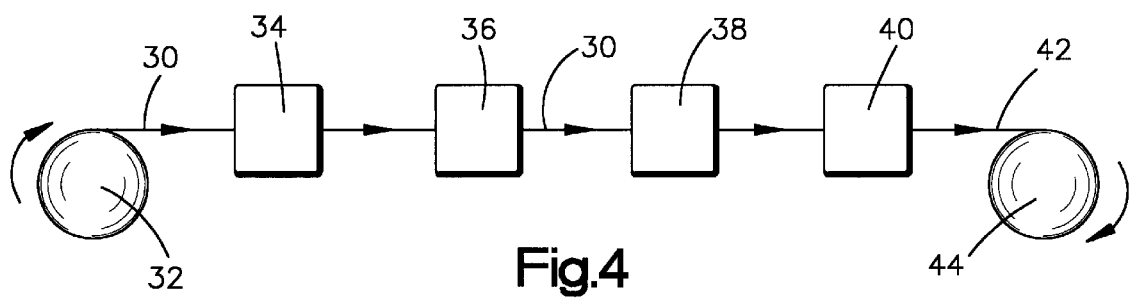
FIG. 4 is a flowsheet of a process for continuously coating metal substrate in accordance with this invention.

FIG. 4 is a flow sheet of a preferred process of this invention for applying the base coat and top coat onto metal substrate. The metal substrate is in strip form and has preferably been cleaned as for example with a Betz MetChem solution such as Betz ® 1010 to remove oils, grease or other contaminants from at least one surface of the strip. As shown in FIG. 4, the metal strip 30 is uncoiled from coil 32 and moves continuously between a first roll coater 34 which applies the base coat, then through an oven 36 for curing the base coat on the strip. The strip 30 next travels between a second roll coater 38 for applying the top coat. From the second roll coater, the strip 30 moves through a second oven 40 for curing the top coat. The base coat and top coat are preferably cured at about 350–450° F., and more preferably about 410° F. for about 20–40 seconds, and more preferably about 30 seconds. The coated strip 42 is rewound on coil 44. The strip 42 is subsequently cut into individual sheets in preparation for transfer printing of the sheets. Alternatively, the strip can be cut into individual sheets without being rewound into a coil.

Figure 5:
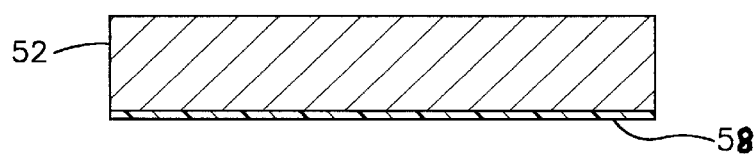
FIG. 5 is a cross-section through apparatus for sublimation printing of metal substrate which has been coated in accordance with this invention.
Figure 5:
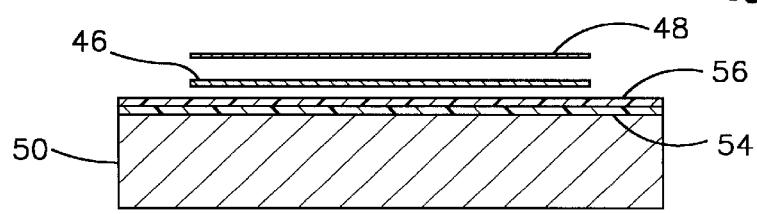

FIG. 5 shows a printing press apparatus for sublimation printing of a sheet 46 of coated substrate in accordance with this invention. The apparatus includes a base or bottom platen 50 on which a coated metal sheet 46 and a sheet of transfer paper 48 are positioned and a top platen 52 for pressing the sheet of transfer paper 48 against the metal sheet to transfer dyes from the paper into the top coat on the metal sheet. The bottom platen preferably has a layer of rubber such as silicone 54 and a felt mat 56 on it for distributing the pressing force against the metal sheet. The top platen preferably has a layer or sheet 58 of plastic such as Teflon® (a trademark of E.I. du Pont de Nemours and Company, Inc.) on its bottom surface to protect the surface of the platen and provide a slightly resilient surface to apply pressure uniformly against the paper 48 and metal sheet as supported by the bottom platen. The top platen 54 also preferably has heating means such as electrical heating rods or coils, not shown, for heating the transfer paper 48 and metal sheet 46. Alternatively, the bottom platen 50 or both the bottom and top platens can have heating coils in them for heating the metal sheet and transfer paper. In a preferred embodiment, the bottom platen 50 is moved vertically (as for example with air bags, not shown) to press the paper 48 and metal sheet 46 tightly together to heat them and cause sublimation transfer of the dye or dyes into the top coat on the metal sheet. As used herein "dye" is used to mean either dye or ink which may be used to create an image and/or color in a substrate. In one preferred embodiment, the top platen 52, paper 48 and metal sheet 46 are heated to about 375–450° F. and pressed together under a pressure of approximately 50–80 psi. The peak metal temperature in sheet 46 is preferably about 350–370° F. The heat and pressure is held for a cycle time in a range of about 10–60 seconds depending on a variety of factors such as the dye colors, kinds and quantity of dyes to be transferred, coating composition, and pressures employed. The transfer press is then opened by lowering the bottom platen, and the decorated sheet 46 and expended paper are removed from the press.

In a preferred mode of operation, the transfer paper has spots of adhesive applied to its top surface so the paper will at least temporarily stick to the top platen 52 when the press is opened after completion of printing. The adhesive may, for example, be diluted Elmers® (a trademark of Borden, Inc.) glue. With such adhesive, the paper is temporarily adhered to the top platen 52, and within a few seconds after opening of the press the expended paper will fall from the platen to be discarded. Meanwhile, the decorated sheet 48 can be removed from the press so the sheet 48 will not be degraded by the expended transfer paper.

The process of this invention is especially well adapted for producing decorated sheet metal that can be formed into three-dimensional articles such a appliance panels and one-piece pictures and frames which are durable and attractive. The coatings of this invention are thin, uniform in thickness, durable and especially well suited for transfer printing of clear, well defined images. The coated and decorated substrates can be formed with small radii of curvature without cracking or crazing of the coatings. Most prior art transfer printed articles have been shaped before they were coated and/or printed because the coatings and/or decorations could not survive the forming process without damage.

Having provided a detailed description of preferred embodiments for practicing the invention, it will be apparent to those skilled in the art that numerous modifications can be made in such embodiments without departing from the invention or the scope of the claims appended hereto. For example, the coated strip metal can also be decorated in strip form before it is cut into individual sheets. Another alternative includes preheating the coated metal sheets before they are placed in the apparatus of FIG. 5 for sublimation printing. A further alternative for the apparatus of FIG. 5 includes moving the top platen, instead of the bottom platen to open and close the press for transfer printing. A still further alternative includes printing coated strip metal continuously or semi-continuously before the strip is cut into individual sheets. Other alternatives falling within the scope of the invention will be apparent to those skilled in the art.

What is claimed is:

1. A process for decorating sheet metal comprising:
   providing sheet metal having at least one clean surface that is substantially free of oils, grease and other contaminants;
   coating said clean surface with thermosetting polymer resin containing a pigment, said coating having a thickness of about 0.0004 to 0.001 inch;
   curing the polymer resin on said clean surface so as to provide a pigmented coated surface;
   coating said pigmented coated surface with a substantially clear thermosetting resin having a thickness of about 0.0004 to 0.001 inch;
   curing said clear thermosetting resin on said sheet metal so as to provide a clear coat on said sheet metal; and
   transfer printing said coated sheet metal to dispose dye in said clear coat.

2. A process as set forth in claim 1 in which at least one of said coatings comprises polyester.

3. A process as set forth in claim 1 in which at least one of said coatings is applied by roll coating said sheet metal.

4. A process as set forth in claim 1 in which said clear thermosetting resin coating has a thickness of about 0.0006 inch.

5. A process as set forth in claim 1 in which at least one of said coatings comprises epoxy.

6. A process as set forth in claim 1 in which said clear thermosetting resin comprises at least about 45% solids.

7. A process as set forth in claim 1 in which said clear thermosetting resin contains approximately 53% solids.

8. A process as set forth in claim 1 in which said sheet metal is an aluminum alloy.

9. A process as set forth in claim 1 in which said sheet metal is steel.

10. A process as set forth in claim 1 in which said sheet metal has a thickness in a range of about 0.010 to 0.040 inches.

11. A process as set forth in claim 1 in which said curing of said resins is effected by heating the resins to about one or more temperatures between 350–450° F.

12. A process as set forth in claim 1 in which said pigment comprises titanium oxide.

13. A process as set forth in claim 1 in which said transfer printing comprises sublimation printing.

14. A process as set forth in claim 1 which includes forming the transfer printed sheet metal into a three-dimensional article having at least one bend radius which is less than about 5 times the thickness of the sheet metal.

15. A process for decorating sheet metal comprising:
   providing aluminum strip metal having a thickness of about 0.020 to 0.040 inch and at least one clean surface on said strip metal that is substantially free of oils, grease and other contaminants;
   roll coating said clean surface with a base coat of thermosetting polyester resin containing white titanium pigment, said base coat having a thickness of about 0.0004 to 0.001 inch;
   thermally curing said polyester resin in said base coat at one or more temperatures between about 350–450° F.;
   roll coating said base coat of said strip metal with a top coat of substantially clear thermosetting polyester resin having a thickness of about 0.0004 to 0.001 inch;
   curing the polyester resin in said top coat at one or more temperatures between about 350–450° F.;
   cutting said strip metal into a plurality of sheets; and
   sublimation printing said sheets to dispose at least one decorative dye in said top coat.

16. A process as set forth in claim 15 which includes forming the sublimation printed sheets into panels for appliances.

17. Decorated sheet material comprising:
   sheet material substrate approximately 0.010 to 0.040 inch thick;
   a base coat of thermoset polyester containing pigment on at least one surface of said substrate, said base coat having a thickness in a range of about 0.0004 to 0.001 inch;
   a top coat of substantially clear thermoset polyester over said base coat, said top coat having a thickness in a range of about 0.0004 to 0.001 inch; and
   transfer printed dyes in said top coat imparting a decorative or informative image to said sheet material.

18. Decorated sheet material as set forth in claim 17 in which said top coat has a substantially uniform thickness of about 0.0006 inch.

19. Decorated sheet metal as set forth in claim 17 in which said transfer printed dyes are sublimation printed dyes.

20. Decorated sheet metal as set forth in claim 17 in which said pigment comprises titanium oxide.

21. Decorated sheet metal as set forth in claim 17 in which said substrate comprises an aluminum base alloy.

22. Decorated sheet material as set forth in claim 21 which has a three-dimensional shape including at least one bend radius which is less than 5 times the thickness of the metal.

23. Decorated sheet material as set forth in claim 22 which includes at least the bend radius of about 2 times metal thickness.

24. Decorated sheet material as set forth in claim 21 which comprises a panel for an appliance.

25. Decorated sheet material as set forth in claim 21 which comprises a one-piece, three-dimensional picture and frame.

26. A process for making a decorated three-dimensional sheet metal article comprising:
   providing sheet metal having at east one clean surface that is substantially free of oils, grease and other contaminants;
   coating said clean surface with thermosetting polymer resin containing a pigment, said coating having a thickness of about 0.0004 to 0.001 inch;
   curing the polymer resin on said clean surface so as to provide a pigmented coated surface;

coating said pigmented coated surface with a substantially clear thermosetting resin having a thickness of about 0.0004 to 0.001 inch;

curing said clear coating on said sheet metal so as to provide a clear coating on said sheet metal;

providing a sheet of transfer paper having a reverse printed dye image therein;

pressing said transfer paper against said clear coating on said sheet metal under heat and pressure to transfer said dye image into said clear coating; and forming said decorated sheet metal into a three-dimensional article having at least one bend radius less than about five times the thickness of said sheet metal.

27. A process for making a decorated three-dimensional sheet metal article as set forth in claim 26 wherein said substantially clear thermosetting resin comprises a material that does not screen or interfere with the visibility of said transferred dye image.

* * * * *